(12) United States Patent
Bouteiller et al.

(10) Patent No.: US 6,807,338 B2
(45) Date of Patent: Oct. 19, 2004

(54) MULTIWAVELENGTH CASCADED RAMAN RESONATOR

(75) Inventors: Jean-Christophe Bouteiller, Somerset, NJ (US); Benjamin John Eggleton, Summit, NJ (US); Clifford Headley, Highland Park, NJ (US); Paul Steinvurzel, Jersey City, NJ (US)

(73) Assignee: Fitel USA Corp., Norcross, GA (US)

( * ) Notice: Subject to any disclaimer, the term of this patent is extended or adjusted under 35 U.S.C. 154(b) by 376 days.

(21) Appl. No.: 09/965,410

(22) Filed: Sep. 27, 2001

(65) Prior Publication Data

US 2002/0126956 A1 Sep. 12, 2002

Related U.S. Application Data

(60) Provisional application No. 60/275,261, filed on Mar. 12, 2001.

(51) Int. Cl.[7] .................................................. G02B 6/34
(52) U.S. Cl. .......................................... 385/37; 385/10
(58) Field of Search ............................. 385/37, 10, 15, 385/8, 9; 372/20, 102; 359/327, 334

(56) References Cited

U.S. PATENT DOCUMENTS

| 5,323,404 A | | 6/1994 | Grubb ............................. 372/6 |
| 5,446,809 A | * | 8/1995 | Fritz et al. ..................... 385/17 |
| 5,557,442 A | * | 9/1996 | Huber .......................... 359/333 |
| 6,020,986 A | * | 2/2000 | Ball ............................... 398/1 |
| 6,163,552 A | | 12/2000 | Engelberth et al. ............ 372/3 |
| 6,181,852 B1 | * | 1/2001 | Adams et al. ................. 385/37 |
| 6,185,023 B1 | * | 2/2001 | Mizrahi ......................... 398/9 |
| 6,453,095 B2 | * | 9/2002 | Feng et al. ................... 385/37 |
| 6,594,288 B1 | * | 7/2003 | Putnam et al. ................. 372/3 |
| 6,633,695 B2 | * | 10/2003 | Bailey et al. ................. 385/24 |

FOREIGN PATENT DOCUMENTS

| JP | 09129958 A | * | 5/1997 | .......... H01S/3/133 |
| WO | WO 01/33285 A2 | | 5/2001 | ............. G02F/1/00 |

OTHER PUBLICATIONS

M. D. Mermelstein et al., "A High–Efficiency Power–Stable Three–Wavelength Configurable Raman Fiber Laser", 2001 Optical Fiber Communication Conference and Exhibit, IEEE Comm. Society, Mar. 2001, pp. cs, PD3–1—3.

* cited by examiner

*Primary Examiner*—Frank G. Font
*Assistant Examiner*—Kevin C Kianni

(57) ABSTRACT

A multi-wavelength cascaded Raman resonator ("MWCRR"). The MWCRR has an optical source for pumping optical radiation centered around an input wavelength. The MWCRR further includes a Raman fiber having at least a first set of optical gratings for converting the pumped optical radiation to wavelengths other than the input wavelength. The Raman fiber also has at least one adjustable output coupler having a variable reflectivity for controlling the power of the optical radiation propagating from the at least one set of optical gratings at the wavelengths other than the input wavelength.

15 Claims, 5 Drawing Sheets

MULTIWAVELENGTH CASCADED RAMAN RESONATOR

PRIORITY APPLICATION

This application claims priority from a provisional U.S. patent application, Ser. No. 60/275,261, filed on Mar. 12, 2001, hereby incorporated by reference.

FIELD OF THE INVENTION

The present invention relates to Raman resonators.

BACKGROUND OF THE INVENTION

Raman amplifiers and resonators are known in the field of optical communications. These devices rely on the Raman effect. When light is transmitted through matter, part of the light is scattered in random directions. A small part of the scattered light has frequencies removed from the frequency of the incident beam by quantities equal to vibration frequencies of the material scattering system. This small part is called Raman scattering. If the initial beam is sufficiently intense and monochromatic, a threshold can be reached beyond which light at the Raman frequencies may be amplified, generally exhibiting the characteristics of stimulated emission. This stimulated emission is commonly referred to as the stimulated Raman scattering.

One device employing the Raman effect is a cascaded Raman resonator ("CRR"). Generally, a CRR receives radiation from a source pump at a particular wavelength, $\lambda_{pump}$, and shifts the radiation through one or more steps to a desired output wavelength, $\lambda_{out}$, where $\lambda_{out}$ is greater $\lambda_{pump}$. While various types of CRRs exist, one type currently being examined is a fiber-based CRR, which shifts the wavelength of the pump light in an optical fiber. Fiber-based CRRs are capable of providing higher power in a single mode fiber than single mode semiconductor diodes. To date, fiber-based CRRs have been used for remote pumping of Er-doped fiber amplifiers, and as pumps for Raman amplifiers.

In an optical fiber, the gain curve from the Raman effect is relatively broad, yet not particularly flat over a wide frequency range. To obtain a flat gain curve, a Raman amplifier may be pumped using several different wavelengths, each triggering the Raman effect. The gain profile of such a Raman amplifier is effectively the superposition of the gain of each of the individual pumps, in addition to the interaction between the pumps. Presently, these pumps have been realized by multiplexing a number of semiconductor laser diodes or CRRs together. Multiplexing schemes, however, add additional cost to the overall device and place wavelength and polarization limitations on the semiconductor diodes. The power required from each single wavelength device is modest when compared to the total power that a CRR is capable of producing. However, the total power in all of the wavelengths is comparable to that obtainable from a CRR. It has therefore been advantageous to turn the large amount of power available at a single wavelength of a CRR into power at multiple wavelengths.

One practical solution for making a multiple wavelength cascaded Raman resonator ("MWCRR") has been to variably distribute power over the output wavelengths. This approach has been disadvantageous because the tolerances imposed by a system on the wavelength power ratio of a MWCRR are tighter than the possible manufacturing tolerances. Moreover, the specifications imposed by the system also depend on the final assembly of the system. The performance of the system, consequently, may be enhanced by dynamically controlling the wavelength power ratio and, hence, the shape of the gain curve. As such, a need remains for the ability to control the wavelength power ratio of a MWCRR.

SUMMARY OF THE INVENTION

We have invented a method for controlling the relative wavelength power distribution in a Raman device, such as, for example, a MWCRR. In accordance with the present invention, an optical device employs at least one output coupler having a reflectivity which may be independently varied or tuned to compensate or achieve a desired power distribution. The reflectivity of the output coupler may be modified using various means, including, for example, applying a non-uniform stress, heat or a voltage/current.

In one example of the present invention, a Raman device, such as, for example, a MWCRR, comprises at least one set of optical gratings coupled with at least a first and a second output coupler for controlling the relative wavelength power distribution. Here, each output coupler has a reflectivity which varies in response to the application of a non-uniform stress, heat or a voltage/current.

BRIEF DESCRIPTION OF THE DRAWINGS

The present invention will be better understood from reading the following description of non-limiting embodiments, with reference to the attached drawings, wherein below:

FIG. 1(a) is a schematic diagram of the quantum mechanical behavior of Raman scattering, while

FIG. 2(a) is a schematic view of a known cascaded Raman resonator, while

It should be emphasized that the drawings of the instant application are not to scale but are merely representations of the invention, which may be determined by one of skill in the art by examination of the information contained herein.

DETAILED DESCRIPTION

Figure 1A:
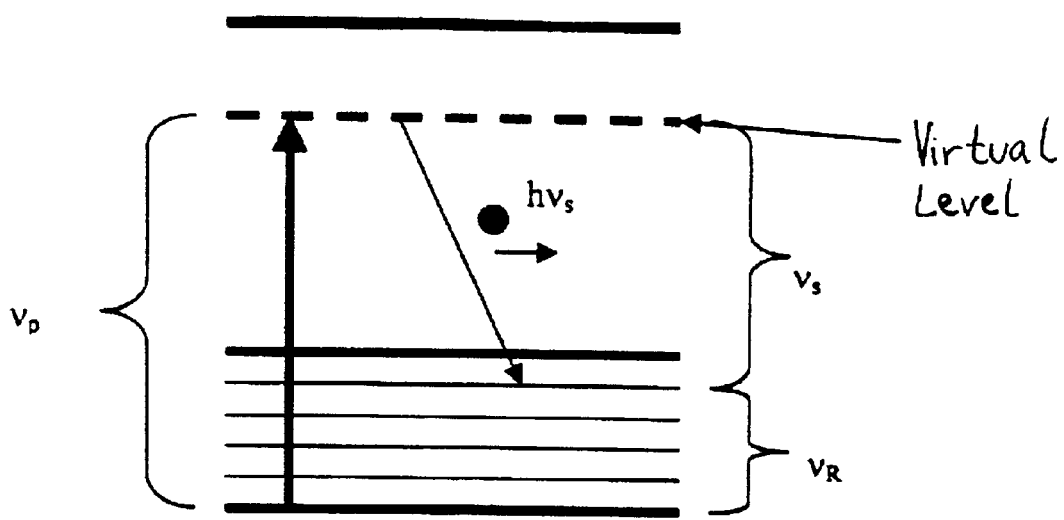

Referring to FIG. 1(a), a schematic diagram of the quantum mechanical behavior of Raman scattering is illustrated. Raman scattering is a process by which light incident on a medium is converted to light at a lower frequency than the incident light. A pump photon, $v_p$, may be excited up to a virtual level (e.g., non-resonant state). The pump photon decays to a lower energy level emitting a photon, $v_s$, relatively quickly during this process. The difference in this energy translates into molecular vibrations having a number of levels. It is these levels that determine the shape of a Raman gain curve.

Figure 1B:
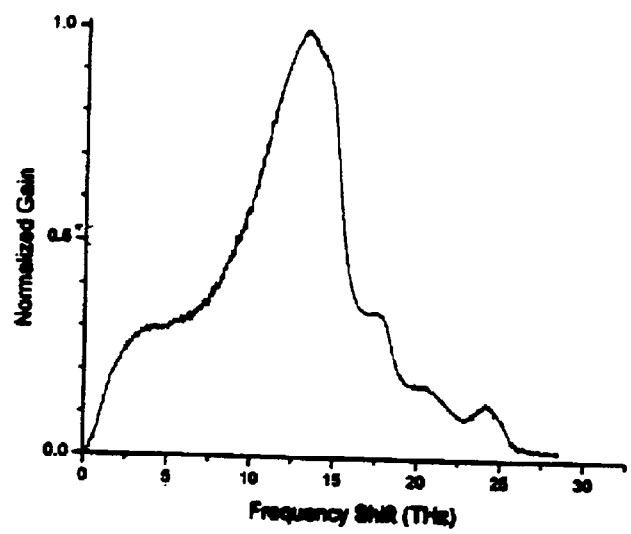
FIG. 1(b), is a graphical illustration of the Raman gain spectrum in an optical fiber.

Referring to FIG. 1(b), a graphical illustration of the Raman gain spectrum in an optical fiber is shown. Here, the normalized gain in an optical fiber is depicted as a function of the frequency shift created by the Raman effect. Due to the amorphous nature of silica fibers, the Raman gain spectrum is relatively broad. Because the pump photon is excited to a virtual level, the Raman gain can occur for a pump source at any wavelength. In Ge-doped silica fibers, the peak of this gain will occur at a frequency about 13 THz away from the frequency of the input light.

Figure 2A:
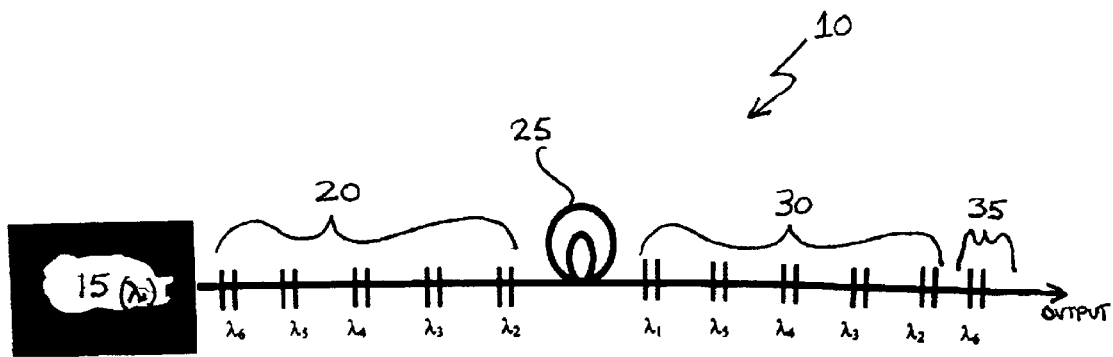

Referring to FIG. 2(a), a schematic view of a known cascaded Raman resonator ("CRR") 10 is shown. CRR 10 may be employed in conjunction with an optical multiplexer, for example, to provide optical gain over a number of wavelengths. More particularly, CRR 10 comprises an optical source 15, such as a pump laser (e.g., Ytterbium-doped cladding pumped fiber laser lasing in the 1060–1200 nm region), for generating continuous wave ("CW") optical radiation at a first wavelength $\lambda_1$. Coupled with source 15 are one or more individual input gratings 20. Each of the one or more input gratings 20 has a reflectivity. In one example, the reflectivity of each input grating 20 is between about eighty (80%) percent and one-hundred (100%) percent—though other operable reflectivities are contemplated herein—and is commonly referred to as a "high reflector." Input gratings 20 are written into a first end of an optical waveguide 25, such as a Raman gain medium (e.g., Raman fiber). Alternatively, input gratings 20 may be spliced onto the first end of an optical waveguide 25. As shown, each grating from input gratings set 20 are centered at second, third, fourth, fifth and sixth Wavelengths $\lambda_2$, $\lambda_3$, $\lambda_4$, $\lambda_5$, and $\lambda_6$.

CRR 10 also comprises one or more output gratings 30. Output gratings 30 are written into or spliced onto a second end of optical waveguide 25. Output gratings 30 are coupled with input gratings 20 by an intermediate section of optical waveguide 25. Much like input gratings 20, each grating of output gratings 30 comprises a high reflector. Each high reflector of output gratings 30 is centered at an individual wavelength $\lambda_1$, $\lambda_2$, $\lambda_3$, $\lambda_4$, and $\lambda_5$.

Coupled with output gratings set 30 is at least one output coupler 35. Output coupler 35 comprises at least one grating centered at sixth wavelength $\lambda_6$. Unlike input and output gratings, 20 and 30, the grating of output coupler 35 has a relatively lesser reflectivity. In one example, output coupler 35 has a reflectivity of less than about eighty (80%) percent. In so doing, output coupler 35 allows optical radiation at sixth wavelength $\lambda_6$ to propagate out from CRR 10.

Operationally, CRR 10 receives CW optical radiation at first wavelength $\lambda_1$ from optical source 15. The CW optical radiation at first wavelength $\lambda_1$ propagates through input gratings 20, and is converted within optical waveguide 25 to second wavelength, $\lambda_2$, and from second wavelength, $\lambda_2$, to third wavelength, $\lambda_2$, and from third wavelength, $\lambda_3$, to fourth wavelength, $\lambda_4$, and from fourth wavelength, $\lambda_4$, to fifth wavelength, $\lambda_5$, and from fifth wavelength, $\lambda_5$, to sixth wavelength, $\lambda_6$, by means of the Raman effect. Input gratings 20, here, improve the efficiency of CRR 10 by reflecting forward any backscattered light back into optical waveguide 25. Any optical radiation propagating through output gratings 30 at first, second, third, fourth and fifth wavelengths, $\lambda_1$, $\lambda_2$, $\lambda_3$, $\lambda_4$, and $\lambda_5$, are reflected back through optical waveguide 25 by one of the high reflectors centered at wavelengths $\lambda_1$, $\lambda_2$, $\lambda_3$, $\lambda_4$, and $\lambda_5$ in output gratings 30. Consequently, optical radiation at first, second, third, fourth, and fifth wavelengths—$\lambda_1$, $\lambda_2$, $\lambda_3$, $\lambda_4$, $\lambda_5$—emanates from optical waveguide 25 reflected back to optical waveguide 25 by one of the gratings of output gratings 30. By this design, optical radiation having a wavelength other than sixth wavelength, $\lambda_6$, is nominally blocked from escaping a cavity forming CRR 10. Consequently, input and output gratings, 20 and 30, effectively convert the wavelength (e.g., $\lambda_1$) of the optical radiation from optical source 15 to a higher wavelength (e.g., $\lambda_6$). This higher wavelength (e.g., $\lambda_6$) is dependent on selecting the center wavelength of the high reflectors of input and output gratings, 20 and 30, as well as the center wavelength of output coupler 35.

Figure 2B:
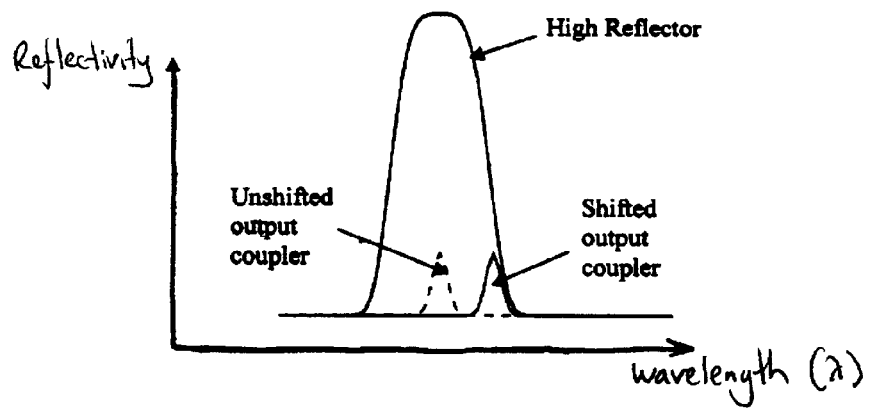
FIG. 2(b) is a graphical illustration of the reflectivity versus wavelength for another known cascaded Raman resonator of FIG. 2(a)

Referring to FIG. 2(b), a graphical illustration of the reflectivity versus wavelength for a known multiple wavelength CRR ("MWCRR") design is illustrated. In this known MWCRR approach, the wavelength power ratio of the MWCRR is controlled by shifting the center wavelength of the output coupler. This deliberate shifting is effectuated by misaligning the cavity of the MWCRR at a particular wavelength. In so doing, the efficiency of the cavity at the particular wavelength is reduced, thereby lowering the power emitted at the particular wavelength. The results of such an implementation are characterized in the graphical illustration of FIG. 2(b).

Figure 3:
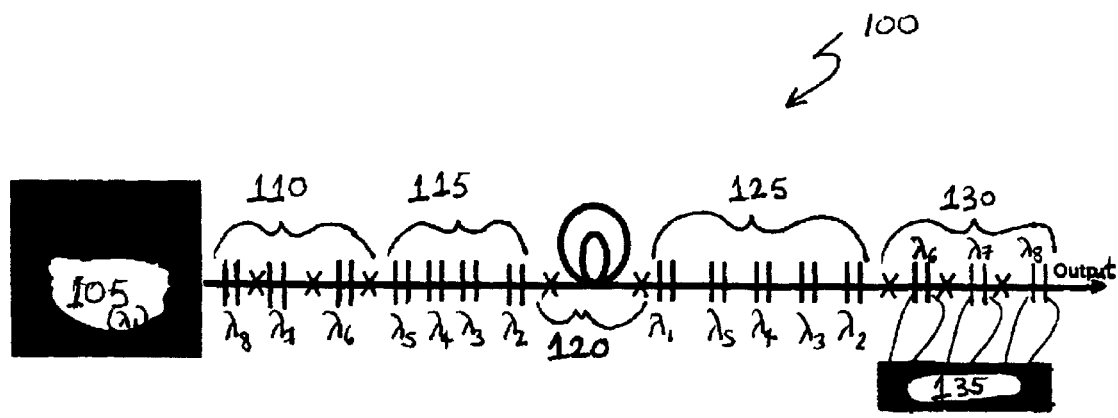
FIG. 3 is a schematic view of an embodiment of the present invention.

Referring to FIG. 3, a schematic view of an embodiment of the present invention is illustrated. Here, a solution is realized for wavelength power distribution control in a MWCRR, for example, without shifting the center wavelength of the output coupler(s). We have recognized that the reflectivity of the output coupler may be controlled, for example, by writing a chirped or unchirped grating into an optical waveguide, such as a Raman optical fiber, of the MWCRR. The optical waveguide in which these gratings are written into or spliced onto may also be coated with a metal. Consequently, the peak reflectivity of these gratings may be decreased by applying a stress, heat (e.g., uniform or non-uniform) or an electrical voltage/current to the coating of the metal of the particular chirped gratings. Likewise, upon removing the stress, heat or electrical voltage/current, the peak reflectivity of these gratings may be relatively increased. As such, the amount of light that may be extracted from the cavity of an MWCRR at a predetermined wavelength may be controlled in accordance with the principles of the present embodiment.

More particularly, the schematic view of FIG. 3 shows a multiple wavelength CRR ("MWCRR") 100 employing the principles of the present embodiment. MWCRR 100 comprises a pump optical source 105, such as a cladding pumped fiber laser, for generating continuous wave ("CW") optical radiation at a first wavelength $\lambda_1$, (e.g., 1100 nm). Coupled with pump optical source 105 are a first and second set of input gratings, 110 and 115. Each of the one or more gratings in both sets of input gratings, 110 and 115, may be chirped or unchirped and realized by a high reflector. In one example, the reflectivity of each grating in both sets of input gratings, 110 and 115, is between about eighty (80%) percent and one-hundred (100%) percent—though other operable reflectivities are contemplated herein. Both sets of input gratings may be written into or spliced onto a first end of an optical waveguide 120, such as a Raman gain medium (e.g., optical fiber). Unlike CRR 10 of FIG. 2(a), the first set of input gratings 110 have been included because of their feedback properties to allow lasing in MWCRR 100. Each grating in both sets of input gratings, 110 and 115, are centered at a second, third, fourth, fifth, sixth, seventh and eighth wavelength $\lambda_2$ (e.g., 1153 nm), $\lambda_3$ (e.g., 1211 nm), $\lambda_4$ (e.g., 1275 nm), $\lambda_5$ (e.g., 1347 nm), $\lambda_6$ (e.g., 1425 nm), $\lambda_7$ (e.g., 1455 nm), and $\lambda_8$ (e.g., 1480 nm).

MWCRR 100 also comprises one or more output gratings 125. Output gratings 125 are written into or spliced onto a second end of optical waveguide 120. Output gratings 125 are coupled with both sets of input gratings, 110 and 115, by an intermediate section of optical waveguide 120. Each grating of output gratings 125 comprises a high reflector. Furthermore, output gratings 125 are centered at the second wavelength, $\lambda_2$ (e.g., 1153 mm), third wavelength, $\lambda_3$ (e.g., 1211 nm), fourth wavelength, $\lambda_4$ (e.g., 1275 nm), and fifth wavelength, $\lambda_5$ (e.g., 1347 nm).

Coupled with output gratings 125 and written into or spliced onto further along the second end of optical waveguide 120 are a number of adjustable output couplers 130. It should be apparent to skilled artisans that alternative configurations may also be operative. For example, output couplers 130 may also be positioned in between optical waveguide 120 and output gratings 125.

Each adjustable output coupler 130 comprises an element having variable reflectivity centered at the sixth wavelength, $\lambda_6$ (e.g., 1425 nm), the seventh wavelength, $\lambda_7$ (e.g., 1455 nm), and the eighth wavelength, $\lambda_8$ (e.g., 1480 nm). In one example, the element within each adjustable output coupler 130 is realized by a chirped or unchirped grating. The reflectivity of each adjustable output coupler 130 is controlled by an individual control system 135. In one example, each control system 135 is realized by a stressing or heating source, or, alternatively, an electrical power source for generating a voltage or current, to modify the reflectivity of its respective adjustable output coupler 130. Each control system 135 modifies the percentage of optical radiation propagation transmitted through its respective adjustable output coupler 130, and therefore the reflectivity of the respective adjustable output coupler 130. Consequently, the amount of optical radiation propagating from the cavity of MWCRR 100 at particularly desirable wavelengths is now controllable. As such, the wavelength power ratio and the shape of the gain curve of MWCRR 100 may be dynamically controlled.

Figure 4:
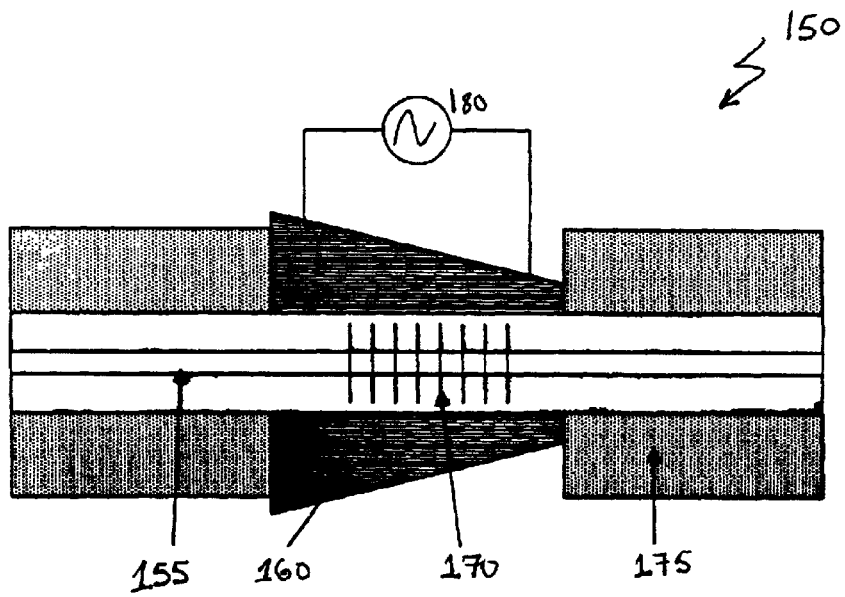
FIG. 4 is a schematic view of a feature of the present invention.

Referring to FIG. 4, a schematic view of a feature of the present invention is illustrated. More particularly, FIG. 4 shows one example of an adjustable output coupler 150, which may be used in MWCRR 100 of FIG. 3. Adjustable output coupler 150 comprises an optical fiber 155, such as, for example, a Raman gain medium (e.g., a Raman fiber), having a standard coating 175. Written into or spliced onto optical fiber 155 is a grating 170. Grating 170 may be chirped or unchirped. Surrounding grating 170 is temperature responsive tapered metal coating 160, in contrast with standard coating 175. Metal coating 160 is coupled with a power source 180 for increasing the temperature of grating 170. The increase in the temperature of grating 170 corresponds with the amount of tapered metal at a given point along metal coating 160 in contact with grating 170, as well as the amount of an electrical current applied thereto. The peak reflectivity of grating 170 may be decreased by applying an electrical voltage/current to metal coating 160 surrounding grating 170. Upon removing the electrical voltage/current from metal coating 160, the peak reflectivity of these gratings may be relatively increased. It should be apparent to skilled artisans that various voltage/current levels generated by power source 180 will correspondingly vary the temperature of grating 170, and thusly, its peak reflectivity. Consequently, the peak reflectivity of grating 170 may be changed by applying stress or heat. In one example, the stress or heat applied to grating 170 by power source 180 is non-uniform.

Figure 5:
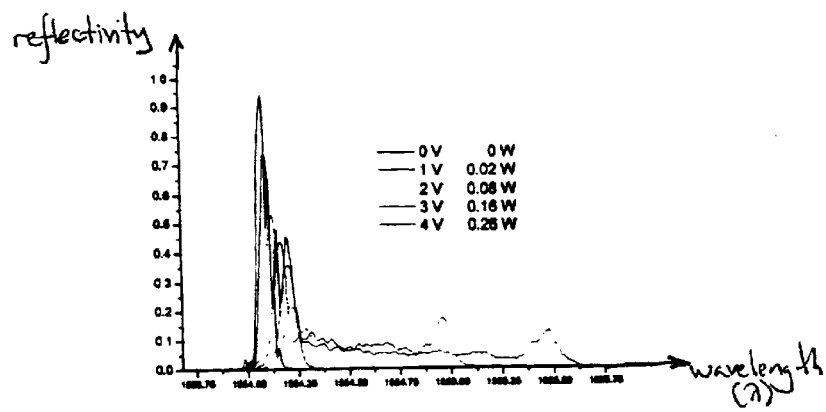
FIG. 5 is a graphical illustration of the reflectivity versus wavelength of the feature depicted in FIG. 4.

Referring to FIG. 5, a graphical illustration of the reflectivity versus wavelength ($\lambda$) of an exemplary adjustable output coupler, such as coupler 150 of FIG. 4, is shown.

Figure 6:
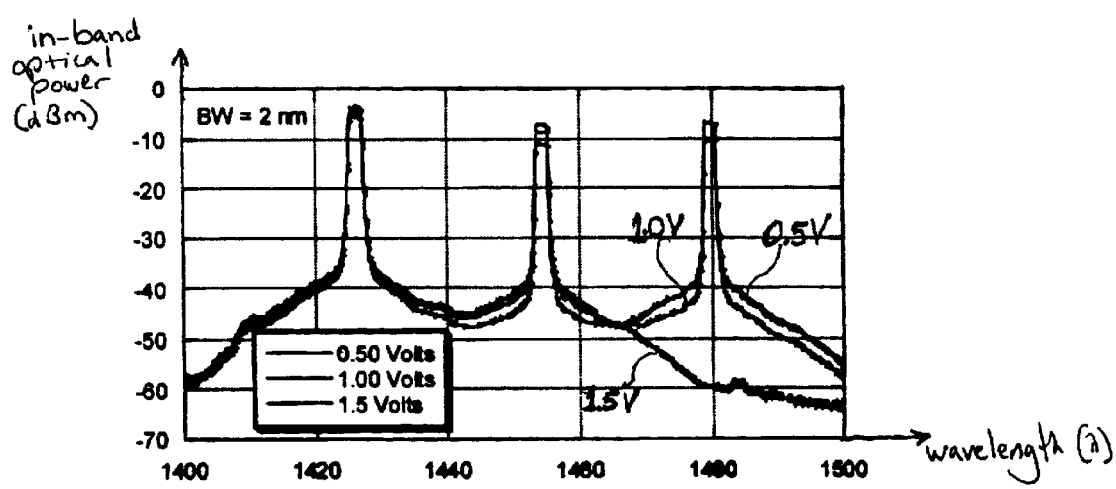
FIG. 6 is a graphical illustration of the in-band optical power versus wavelength of an example of the embodiment of FIG. 3.

Referring to FIG. 6, a graphical illustration of the in-band optical power versus wavelength ($\lambda$) of an exemplary MWCRR, such as MWCRR 100 of FIG. 3, is shown. From this graphical illustration, as the voltage applied to an adjustable output coupler centered at the eighth wavelength, $\lambda_8$, of 1480 nm is increased, the output power at that wavelength decreases. Consequently, it should be apparent to skilled artisans that similar results may be obtained by changing the voltage applied to adjustable output couplers centered at the sixth or seventh wavelengths, $\lambda_6$ or $\lambda_7$, of 1425 m or 1455 nm, respectively.

Figure 7:
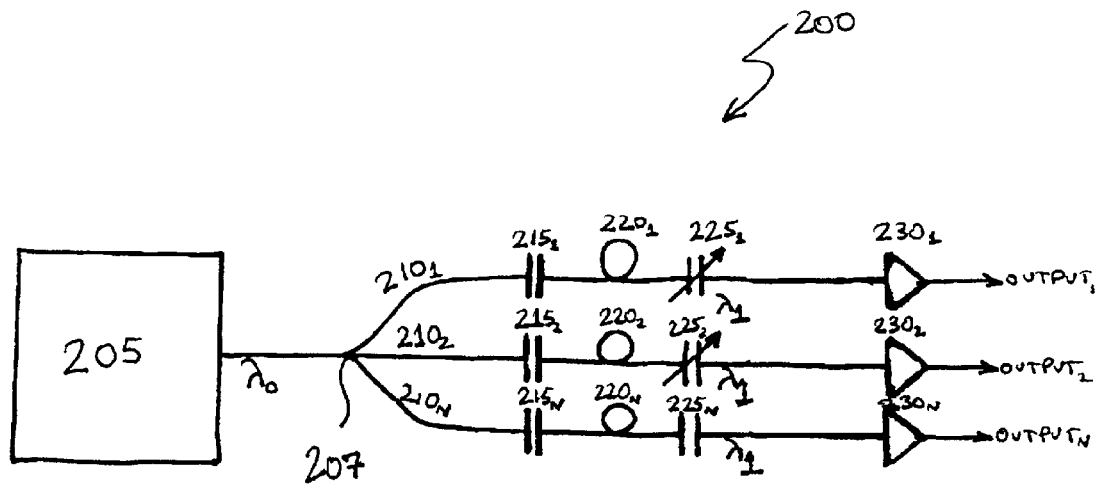
FIG. 7 is a schematic view of another embodiment of the present invention.

Referring to FIG. 7, a schematic view of another embodiment of the present invention is illustrated. Here, an optical apparatus 200 is shown for varying the intensity of optical radiation for a single wavelength over a number of output lines. More particularly, optical apparatus 200 comprises an optical source 205, such as a pump laser, for generating continuous wave ("CW") optical radiation at a first wavelength $\lambda_0$. The CW optical radiation from optical source 205 is divided by a splitter 207 into N number of lines ($210_1$, $210_2$ through $210_N$), where N is greater than or equal to two.

Each line in optical apparatus 200 comprises a high reflector ($215_1$, $215_2$ through $215_N$), coupled with an adjustable output coupler ($225_1$, $225_2$ through $225_N$) by means of an optical waveguide ($220_1$, $220_2$ through $220_N$), such as a Raman optical fiber. Each adjustable output coupler is centered around the same individual wavelength (e.g., $\lambda_1$). Alternatively, each adjustable output coupler may be centered around individual wavelengths (e.g., $\lambda_1$, $\lambda_2$ through $\lambda_N$)—depending on the purpose of the dividing the optical radiation. The output from each adjustable output coupler is fed into an optical amplifier ($230_1$, $230_2$ through $230_N$) to generate N number of outputs ($OUTPUT_1$, $OUTPUT_2$ through $OUTPUT_N$). Consequently, the power level (e.g., intensity) of each output may be adjusted, as such, by varying each adjustable output coupler. As a result, the outputs ($OUTPUT_1$, $OUTPUT_2$ through $OUTPUT_N$) may have individual power levels or intensities ($I_1$, $I_2$ through $I_N$). Moreover, the adjusted power level of the outputs may be centered around the same wavelength ($\lambda_1$), or individual wavelengths (e.g., $\lambda_1$, $\lambda_2$ through $\lambda_N$).

Figure 8:
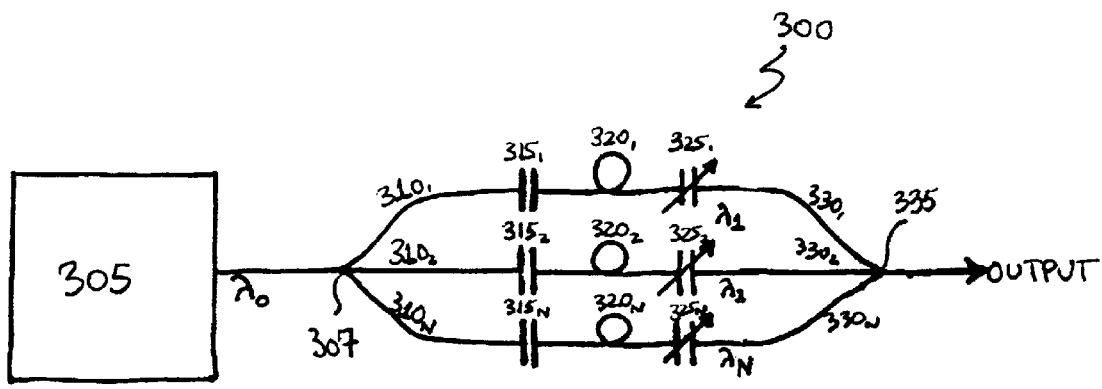
FIG. 8 is a schematic view of yet another embodiment of the present invention.

Referring to FIG. 8, a schematic view of another embodiment of the present invention is illustrated. Here, an optical apparatus 300 for selecting the power distribution of at least two wavelengths. More particularly, optical apparatus 300 comprises an optical source 305, such as a pump laser, for generating continuous wave ("CW") optical radiation at a first wavelength $\lambda_0$. The CW optical radiation from optical source 305 is divided by a splitter 307 into N number of lines ($310_1$, $310_2$ through $310_N$) where N is greater than or equal to two.

Each line in optical apparatus 300 comprises a high reflector ($315_1$, $315_2$ through $315_N$), coupled with an adjustable output coupler ($325_1$, $325_2$ through $325_N$) by means of an optical waveguide ($320_1$, $320_2$ through $320_N$), such as a Raman optical fiber. Since each adjustable output coupler is centered around an individual wavelength ($\lambda_1$, $\lambda_2$ through $\lambda_N$). The output lines ($330_1$, $330_2$ through $330_N$) from each adjustable output coupler are each fed to a combiner 335 for combining the optical radiation at each individual wavelength ($\lambda_1$, $\lambda_2$ and $\lambda_N$) into a single line output (OUTPUT). Consequently, power level of each of the individual wavelengths ($\lambda_1$, $\lambda_2$ through $\lambda_N$) may be adjusted within the single line output (OUTPUT) by varying one or more of the adjustable output couplers ($325_1$, $325_2$ through $325_N$).

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. It is therefore contemplated that the appended claims will cover any such modifications or embodiments as fall within the true scope of the invention.

What is claimed is:

1. An optical device comprising:

an optical source for pumping input optical radiation centered around an input wavelength; and at least one adjustable output coupler, coupled with the optical source, for controlling the input optical radiation at one or more output wavelengths wherein the at least one adjustable output coupler is coated with a metal coating in such a way that the reflectivity of the at least one adjustable output coupler varies in response to applying stress, heat or electrical power to the metal coating.

2. The optical device of claim 1, wherein the reflectivity of the at least one adjustable output coupler vanes in response to a control signal.

3. The optical device of claim 1, further comprising:

at least one set of optical gratings, each optical grating of the set converting the pumped optical radiation to wavelengths greater than or equal to the input wavelength.

4. The optical device of claim 3, wherein each optical grating of the set comprises a chirped or an unchirped design, and the output wavelengths are greater than the input wavelength.

5. The optical device of claim 4, wherein each optical grating of the set has a reflectivity of about one-hundred percent or less.

6. A cascaded Raman resonator comprising an optical source for pumping optical radiation centered around an input wavelength;

at least one set of optical gratings for converting the pumped optical radiation to wavelengths other than the input wavelength; and at least one adjustable output coupler for controlling the power of the optical radiation propagating from the at least one set of optical gratings at the wavelengths other than the input wavelength wherein the at least one adjustable output coupler is coated with a metal coating in such a way that the reflectivity of the at least one adjustable output coupler varies in response to applying stress, heat or electrical power to the metal coating.

7. The cascaded Raman resonator of claim 6, wherein the reflectivity of the at least one adjustable output coupler varies in response to a control signal.

8. The cascaded Raman resonator of claim 6, wherein each optical grating of the at least one set comprises a chirped or an unchirped design, and wherein the wavelengths other than the input wavelength are greater than the input wavelength.

9. The cascaded Raman resonator of claim 8, wherein each optical grating of the at least one set has a reflectivity of about one-hundred percent or less.

10. The cascaded Raman resonator of claim 8, wherein the at least one set of optical gratings and the at least one adjustable output coupler are written into or spliced onto an optical waveguide.

11. A multi-wavelength cascaded Raman resonator comprising:

an optical source for pumping optical radiation centered around an input wavelength; and a Raman optical fiber comprising:

at least a first set of optical gratings for converting the pumped optical radiation to wavelengths other than the input wavelength; and at least one adjustable output coupler having a variable reflectivity for controlling the power of the optical radiation propagating from the at least one set of optical gratings at the wavelengths other than the input wavelength wherein the at least one adjustable output coupler is coated with a metal coating in such a way that the reflectivity of the at least one adjustable output coupler varies in response to applying stress, heat or electrical power to the metal coating.

12. The multi-wavelength cascaded Raman resonator of claim 11, further comprising at least a second set of optical gratings for converting the pumped optical radiation to wavelengths other than the input wavelength.

13. The multi-wavelength cascaded Raman resonator of claim 12, wherein each optical grating of the at least first and second sets comprise a chirped or an unchirped design, and wherein the wavelengths other than the input wavelength are greater than the input wavelength.

14. The multi-wavelength cascaded Raman resonator of claim 13, wherein each optical grating of the at least first and second sets has a reflectivity of about one-hundred percent or less.

15. The multi-wavelength cascaded Raman resonator of claim 14, wherein the at least first and second sets of optical gratings and the at least one adjustable output coupler are written into or spliced onto the Raman optical fiber.

* * * * *